United States Patent
Vyas

(10) Patent No.: US 6,198,194 B1
(45) Date of Patent: Mar. 6, 2001

(54) SEGMENTED ROTOR FOR AN ELECTRIC MACHINE

(75) Inventor: Rajeev Vyas, Rochester Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/399,267

(22) Filed: Sep. 17, 1999

(51) Int. Cl.$^7$ ................................................ H02K 1/22
(52) U.S. Cl. ........................................ 310/261; 29/598
(58) Field of Search .................................. 310/168, 261, 310/114; 318/701; 29/598

(56) References Cited

U.S. PATENT DOCUMENTS

| | | | |
|---|---|---|---|
| 3,171,049 | * 2/1965 | Jarrett | 310/168 |
| 3,700,944 | 10/1972 | Heintz | 310/168 |
| 3,959,672 | * 5/1976 | Walker et al. | 310/49 R |
| 3,992,641 | 11/1976 | Heinrich et al. | 310/168 |
| 4,536,672 | 8/1985 | Kanayama et al. | 310/268 |
| 4,626,719 | * 12/1986 | Foster | 310/49 R |
| 4,670,696 | 6/1987 | Byrner et al. | 318/701 |
| 4,902,923 | 2/1990 | Okauchi | 310/268 |
| 4,920,292 | * 4/1990 | Albrecht et al. | 310/114 |
| 4,959,578 | 9/1990 | Varga | 310/268 |
| 5,245,238 | 9/1993 | Lynch et al. | 310/116 |
| 5,485,046 | * 1/1996 | Kaplan et al. | 310/166 |
| 5,619,087 | 4/1997 | Sakai | 310/268 |
| 5,679,995 | * 10/1997 | Nagate et al. | 310/156 |
| 5,729,065 | 3/1998 | Fremery et al. | 310/90.5 |
| 5,739,612 | * 4/1998 | Davenport | 310/113 |
| 5,747,912 | 5/1998 | Sakuma et al. | 310/261 |
| 5,763,976 | 6/1998 | Huard | 310/168 |

* cited by examiner

Primary Examiner—Joseph Waks
(74) Attorney, Agent, or Firm—Tarolli, Sundheim, Covell, Tummino & Szabo L.L.P.

(57) ABSTRACT

A rotor (10) for an electric machine (40) includes a first elongated rotor segment (12) having a plurality of axially extending rotor poles (20) arranged in a circular array about a central axis (18) that extends longitudinally through the first rotor segment(12). A second axially extending rotor segment (14) engages and is fixed relative to the first rotor segment (12). The second rotor segment (14) has a plurality of axially extending rotor poles (38) arranged in a circular array about the central axis (18). The poles (38) of the second rotor segment (14) are rotated in a first direction about the central axis relative to the poles (20) of the first rotor segment (12). Preferably the rotor (10) also includes a third axially extending rotor segment (16) that engages and is fixed relative to at least one of the first and second rotor segments (12, 14). The third rotor segment (16) also has a plurality of axially extending rotor poles (44) arranged in a circular array about the central axis (18). The poles (44) of the third rotor segment (16) are rotated about the central axis (18) relative to the poles (20, 38) of each of the first and second rotor segments (12, 14).

7 Claims, 4 Drawing Sheets

SEGMENTED ROTOR FOR AN ELECTRIC MACHINE

TECHNICAL FIELD

The present invention relates to an electrical machine and, more particularly, to a segmented rotor for a variable reluctance electric machine.

BACKGROUND OF THE INVENTION

One type of variable reluctance motor utilizes a rotor formed of axially spaced apart disks that are rotatable relative to a stator portion. The stator portion is stationary and also formed of disks located intermediate adjacent pairs of the rotor disks. A stator winding circumscribes each stator pole pair and, when energized, directs an electromagnetic field axially through a magnetic circuit formed of the energized stator pole pair and adjacent rotor poles. Torque is generated when a pair of rotor poles move toward a position of axial alignment relative to an adjacent energized stator pole pair to minimize the reluctance. Examples of this type of variable reluctance motor are disclosed in U.S. Pat. No. 3,700,944 to Heintz and U.S. Pat. No. 3,992,641 to Heinrich et al.

Another type of variable reluctance motor is formed of an elongated rotor mounted coaxially within an elongated annular stationary stator. Each of the rotor and stator has a plurality of radially protruding poles or teeth that extend axially. An annular air gap separates the rotor poles from the stator poles. The stator generates an electromagnetic field when a stator winding associated with a pair of opposed stator poles is energized. The electromagnetic field is directed radially with respect to a central axis extending longitudinally through the rotor and the stator. The electromagnetic field urges a pair of opposed rotor poles into radial alignment with the stator poles being energized to minimize the reluctance of the corresponding magnetic circuit formed by the energized stator poles and adjacent rotor poles. The movement of the rotor, in turn, generates torque. Examples of this type of variable reluctance machine are disclosed in U.S. Pat. No. 4,670,696 to Byrne et al. and U.S. Pat. No. 5,747,912 to Sakuma et al.

SUMMARY OF THE INVENTION

The present invention is directed to a rotor for an electric machine that includes a first elongated rotor segment having a plurality of axially extending rotor poles arranged in a circular array about a central axis that extends longitudinally through the rotor. A second rotor segment, which engages the first rotor segment, has a plurality of axially extending rotor poles arranged in a circular array about the central axis. The poles of the second rotor segment are rotated in a first direction about the central axis relative to the poles of the first rotor segment. The rotor also includes a third rotor segment that engages at least one of the first and second rotor segments. The third rotor segment has a plurality of axially extending rotor poles arranged in a circular array about the central axis. The poles of the third rotor segment are rotated in a second direction about the central axis relative to the poles of the first rotor segment.

BRIEF DESCRIPTION OF THE DRAWINGS

The foregoing and other features and advantages of the invention will become more apparent to one skilled in the art upon consideration of the following description of the invention and the accompanying drawings in which.

DESCRIPTION OF PREFERRED EMBODIMENTS

Figure 1:
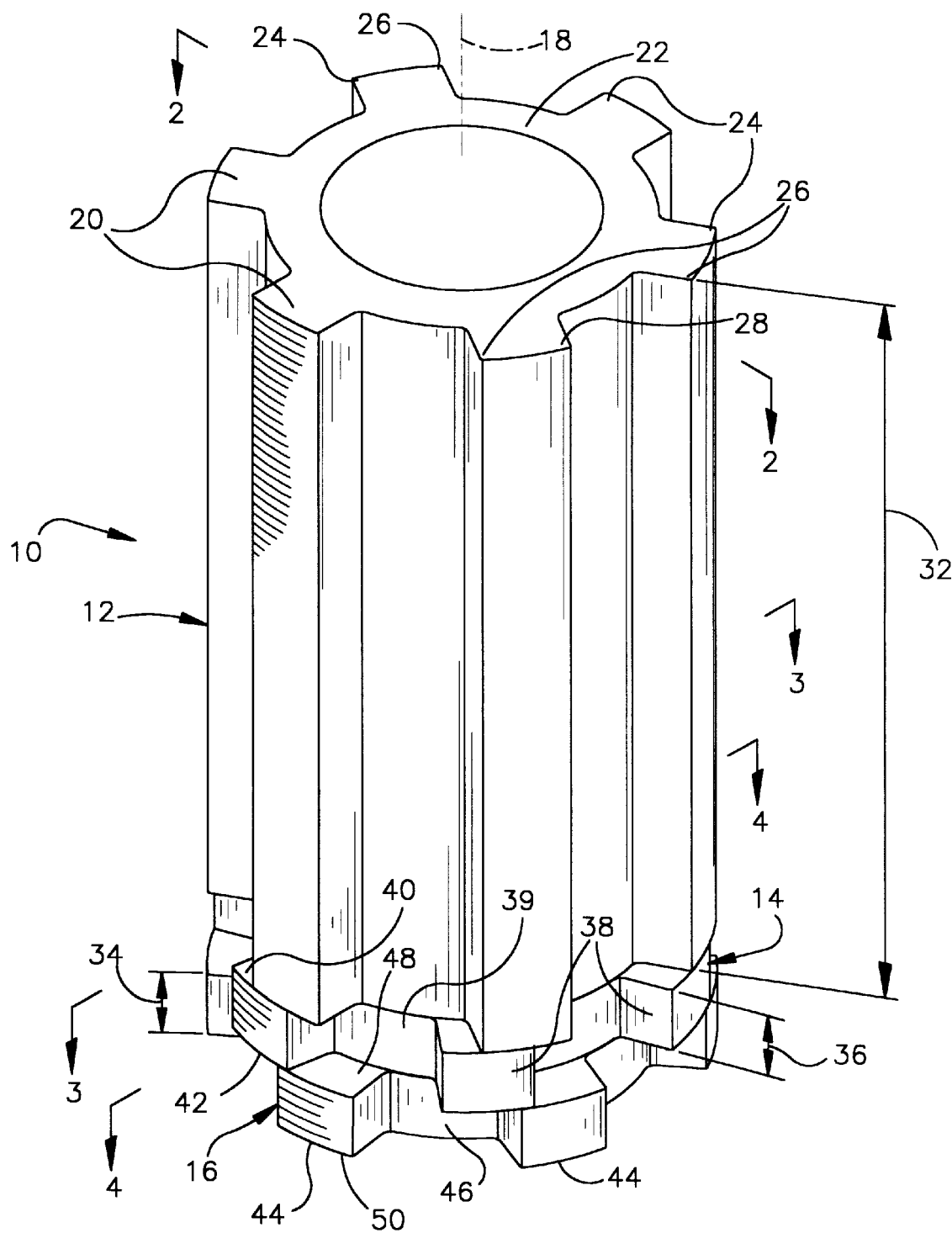
FIG. 1 is an isometric view of a first embodiment of a rotor in accordance with the present invention.
Figure 2:
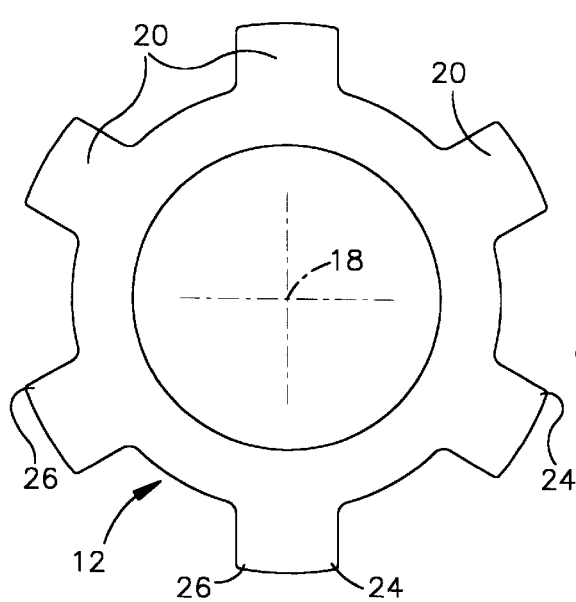
FIG. 2 is a top elevation of a first part of the rotor of FIG. 1 taken along line 2—2.
Figure 3:
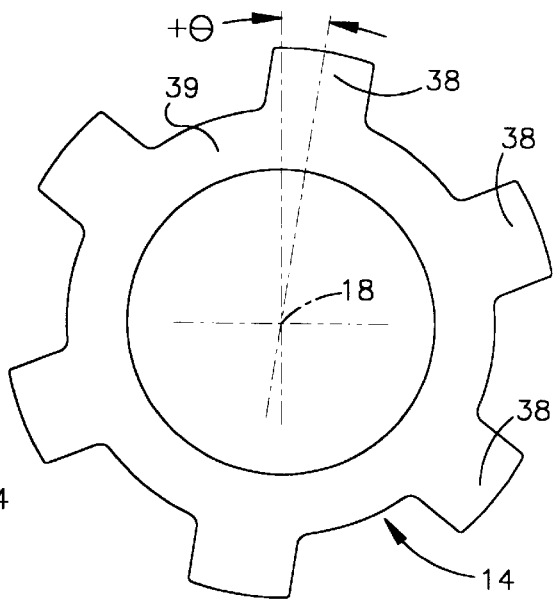
FIG. 3 is a top elevation of a second part of the rotor of FIG. 1 taken along line 3—3.
Figure 4:
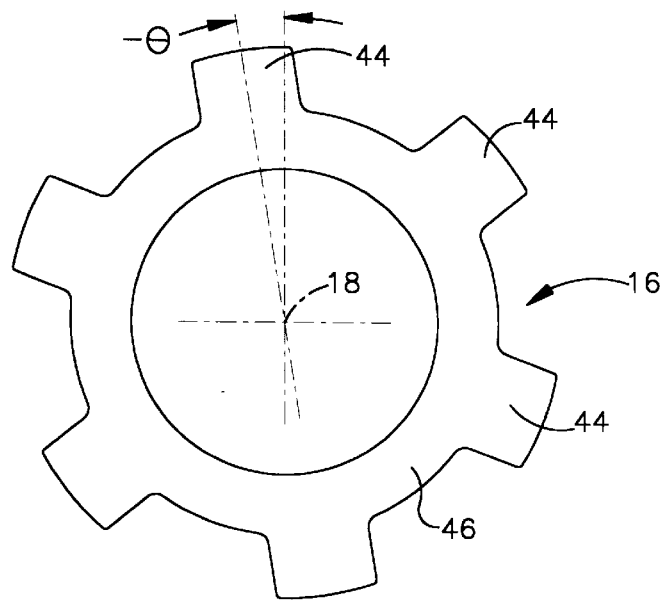
FIG. 4 is a top elevation of a third part of the rotor of FIG. 1 taken along line 4—4.

FIGS. 1–4 illustrate a rotor 10, in accordance with the present invention, formed of three axially extending rotor segments 12, 14 and 16. Each of the rotor segments 12, 14 and 16 circumscribes a central axis 18 extending through the rotor 10. Preferably, each of the rotor segments 12, 14 and 16 is formed of a plurality of axially stacked laminations that are secured together, such as by welding or other known methods, to form the segmented rotor stack 10.

The first rotor segment 12 has a plurality of axially extending rotor poles 20 arranged in a circular array about the central axis 18. Each of the poles 20 protrudes radially outwardly from a generally cylindrical core 22. Each of the poles 20 is circumferentially spaced apart from adjacent poles.

In addition, the radially outer corners 24 and 26 of each of the poles 20 preferably are chamfered or curved, having from about a one degree to about a three degree radial arc that extends the axial length of each pole 20. The chamfered pole corners 24 and 26 reduce flux linking between unaligned poles 20 of the elongated rotor segment 12 and an energized phase of a stator in which the rotor 10 is mounted. This, in turn, helps to avoid magnetic saturation that typically occurs at the corners of opposed rotor poles of a conventional rotor segment when an adjacent stator pole is energized. When a rotor pole corner becomes saturated, the affected pole is less responsive to an electromagnetic field and, in turn, produces less torque for a given amount of electric current. The rounded corners 24 and 26 of the poles 20 inhibit such saturation from occurring and, therefore improves the torque response of a motor.

The rotor segment 12 also has ends 28 and 30 that are axially spaced apart a length, indicated at 32. The axial length 32 of rotor segment 12 preferably is much greater than axial lengths 34 and 36 of the other rotor segments 14 and 16, respectively. For example, the length 32 of the segment 12 may be from about 70 mm to about 90 mm, while the lengths 34, 36 of each respective segment 14, 16 ranges be from about 5 mm to about 15 mm.

The second rotor segment 14 also includes a plurality of axially extending rotor poles 38 that protrude radially from an inner cylindrical core 39. The cylindrical core 39 is aligned axially with the cylindrical core 22. The rotor poles 38 are circumferentially spaced apart in a circular array about the central axis 18. The configuration of each pole 38 is substantially similar to each corresponding pole 20. However, rather than the entire pole pitch of each of the poles 38 being aligned axially with a corresponding pole 20 of the first rotor segment 12, as in a conventional rotor, the rotor segment 14, including the poles 38, is rotated about the central axis 18 relative to the first rotor segment 12. Preferably, the center of each of the poles 38 is rotated a predetermined amount in a clockwise direction, indicated at +θ in FIG. 3, relative to the center of each corresponding pole 20 of the rotor segment 12. For example, +θ ranges from about six degrees to about nine degrees.

The second rotor segment 14 has spaced axially apart ends 40 and 42. The second rotor segment 14 also engages and is fixed relative to the first rotor segment 12. In particular, a lamination of the rotor segment 14 at the first end 28 axially engages a lamination of the rotor segment 12 at the second end 30. At least part of these axially engaging laminations are fixed together in a known manner, such as by welding, so that the angular orientation of the rotor poles 38 and 20 are fixed relative to each other.

The third rotor segment 16 also includes a plurality of axially extending rotor poles 44 arranged in a circular array about the central axis 18. The poles 44 protrude radially outwardly from an inner cylindrical core 46. The core 46 is axially aligned with the cores 22 and 39 of the respective first and second rotor segments 12 and 14. The third rotor segment 16 extends axially a predetermined length, indicated at 36, between first and second ends 48 and 50. A substantial part of the first end 48 axially engages the second end 30 of the first rotor segment 12. Specifically, a lamination of the rotor segment 16 at the first end 48 axially engages and is fixed to a lamination of the rotor segment 14 at its second end 42.

The rotor poles 44 are dimensioned and configured to be substantially identical to the poles 38 of the second rotor segment 14. The rotor poles 44 are circumferentially spaced apart in a circular array about the central axis 18. The rotor segment 16, including the poles 44, is rotated in a counterclockwise direction about the axis 18 relative to corresponding rotor segments 12 and 14. Preferably, a center of each pole 44 is rotated or offset a predetermined amount, indicated at −θ in FIG. 4, relative to the center of a corresponding pole 20 of the first rotor segment 12. The angle −θ, for example, ranges from about six degrees to about nine degrees in a counterclockwise direction relative to rotor segment 12. This is opposite of the direction that rotor segment 14 is rotated relative to the rotor segment 12. The angular orientation of the rotor poles 44 is fixed relative to the rotor poles 20 and 38 of the respective first and second rotor segments 12 and 14.

Figures 5, 6:
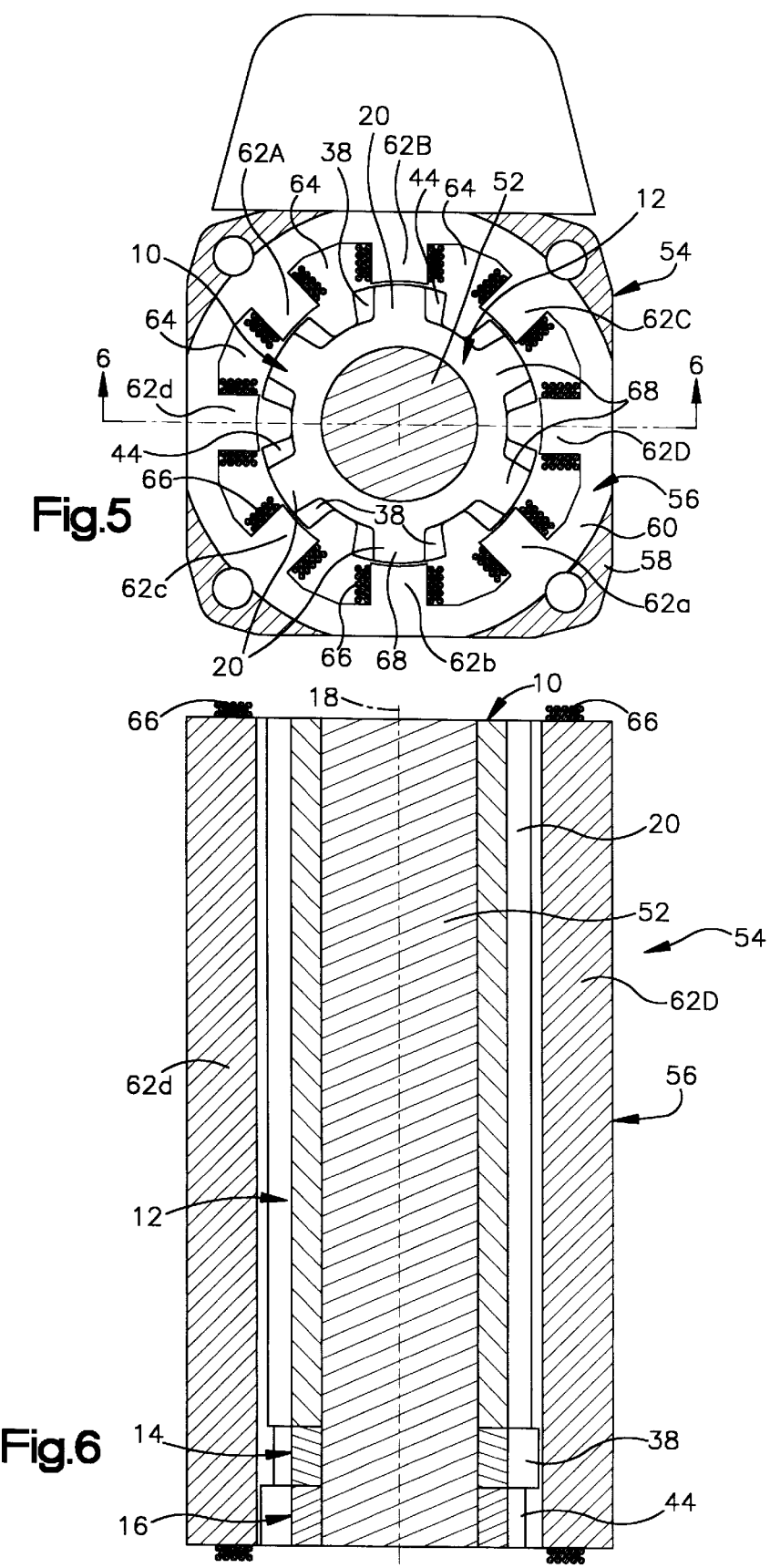
FIG. 5 is a sectional view of an electric machine in accordance with the present invention.
FIG. 6 is a side sectional view of the electric machine of FIG. 5 taken along line 6—6.

FIGS. 5 and 6 schematically illustrate a variable reluctance machine or motor 54 that includes the rotor 10 in accordance with the present invention. The relative angular orientation of the poles 20, 38 and 44 remains fixed. In addition, each of the rotor segments 12, 14, 16 is secured concentrically about an elongated shaft 52 that extends axially through the rotor 10 to provide for rotation relative to a stator 56. The shaft 52 may be a solid rod or a hollow tube which, for example, forms part of a drive mechanism.

The stator 56 is fixed relative to an elongated motor housing 58. The housing 58 encloses the stator 56 and the rotor 10, with the rotor shaft 52 being supported at adjacent ends (not shown) of the housing for rotation of the rotor 10 and rotor shaft 52 about the central axis 18.

The stator 56 includes a generally cylindrical metal core portion 60 affixed to the housing 58. The stator 56 also includes a plurality of axially extending poles 62 that protrude radially inwardly from the core portion 60. A plurality of axially extending slots 64 are formed between each adjacent pair of stator poles 62. The stator poles 62 are circumferentially spaced apart in a circular array around the central axis 18. Preferably, the stator 56 is formed of a plurality of axially stacked laminations which are secured together in a known manner. The stator 56 has an axial length commensurate with or greater than the axial length of the rotor 10.

A plurality of stator phase windings 66 are disposed in the slots 64. Each winding is wound around a diametrically opposed pair of stator poles 62. The stator windings 66 are connected with appropriate vehicle electrical circuitry (not shown) for controlling the flow of electric current through the windings 54. This, in turn, controls the electromagnetic field provided by each stator pole pair and, in turn, the torque provided by the motor 54.

The stator 56 shown in FIGS. 5 and 6 has eight stator poles 62 which are arranged to be energized in pole pairs, indicated at 62A, 62a, 62B, 62b, 62C, 62c, 62D, and 62d. The letters which follow each reference number represent the four phases Aa, Bb, Cc, and Dd of the motor 54. Each pole pair 62A, 62a, 62B, 62b, 62C, 62c, 62D, and 62d is wound by a separate phase winding 66. While the motor 54 is illustrated as a four-phase variable reluctance motor, the present invention is equally applicable to machines having other number of phases.

The rotor 10 is rotatably mounted coaxially within the stator 56. The rotor 10 is secured to the rotor shaft 52, such as by being press-fit onto the shaft. The rotor 10 includes six axially extending pole portions 68 which are circumferentially spaced apart and circumscribe the central axis 18, as described above. The pole portions 68 are formed of the corresponding poles 20, 38 and 44. Preferably, as described above, only part of each pole 38 and 44 of each respective rotor segment 14 and 16 is axially aligned with a corresponding pole 20 of the rotor segment 12, thereby forming each pole portion 68.

The rotor 10 preferably is formed of a magnetic material, such as iron or another magnetic material, so that the pole portions 68 are responsive to the electromagnetic field provided by an energized pair of stator poles 62A, 62a, 62B, 62b, 62C, 62c, 62D, and 62d.

Figure 7:
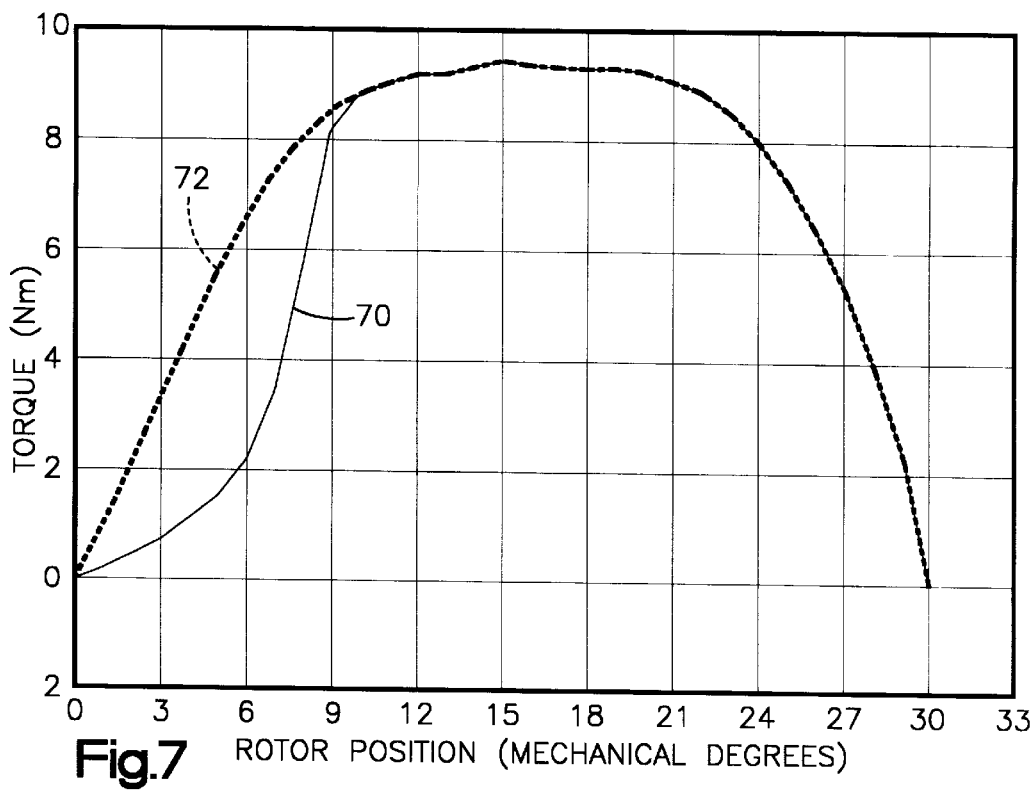
FIG. 7 is a graph illustrating torque versus rotor position for the machine of FIG. 5.

FIG. 7 is a graph illustrating torque (Nm) as a function of rotor position (mechanical degrees) for a over thirty mechanical degrees of rotor rotation. A first curve 70 illustrates a torque-angle curve for a conventional variable reluctance motor. The curve 70 shows a significant amount of drag associated with about the first nine degrees of mechanical movement. A second curve 72 shows a torque-angle curve 72 for a motor 54 having a rotor 10 configured in accordance with the present invention. In contrast to the curve 70, the curve 72 exhibits substantially symmetric torque over the entire first thirty degrees of rotor position. Advantageously, the curve 72 does not exhibit the significant drag inherent in a conventional variable reluctance motor, shown by curve 70.

Referring to FIGS. 5 and 6, there is a slight displacement between a magnetic neutral axis and the geometric neutral axis for each rotor pole portion 68. This displacement is more pronounced when a pole portion 68 is out of radial alignment with an energized stator pole 62A, 62a, 62B, 62b, 62C, 62c, 62D, or 62d. For example, when the winding 66 for the stator pole pair 62A and 62a is energized, rotor segment 14 has a pair of opposed rotor poles 38 that are either partially or wholly aligned with the excited stator pole pair while the poles of the longer rotor segment 12 are out of alignment. Accordingly, the rotor segment 14 has poles 38 that are exposed to a greater amount of the electromagnetic field provided by the energized stator poles 62A and 62a. The increased exposure of at least part of the rotor portion 68 to the electromagnetic field facilitates movement of the rotor 10 toward a position of minimum reluctance. This, in turn, provides an increase in the amount of torque for a given amount of current, i.e., there is an increased torque-to-current gain when running up or down the torque-angle curve 72 (FIG. 7).

While the benefits have been described with respect to a single rotor pole portion 68 and energized stator pole pair 62A and 62a, each rotor pole portion 68 and adjacent stator pole 62A, 62a, 62B, 62b, 62C, 62c, 62D, and 62d achieves similar torque-angle characteristics. Additionally, because the rotor 10 has two rotor segments 14 and 16, which are shifted in opposite directions, the motor 54 is able to achieve a more symmetric torque-angle response when the motor 54 is energized to rotate the rotor in either a clockwise or counterclockwise direction.

Figure 8:
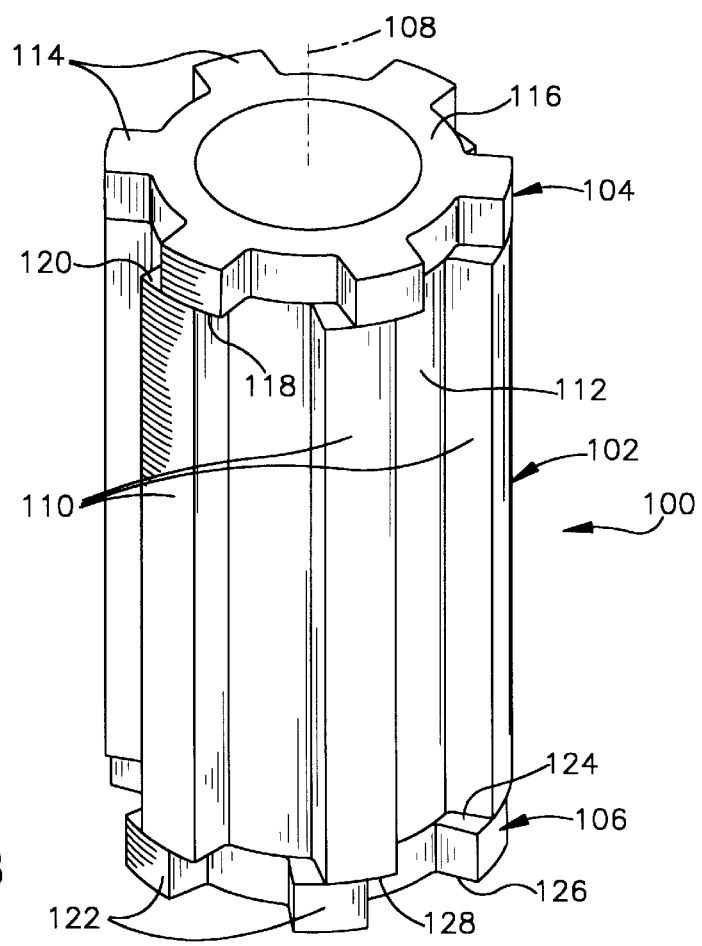
FIG. 8 is an isometric view of another embodiment of a rotor in accordance with the present invention.

FIG. 8 illustrates an alternative embodiment of a rotor 100, in accordance with the present invention, formed of three coaxial rotor segments 102, 104, and 106. In particular, the rotor 100 is formed of an elongated rotor segment 102 mounted intermediate two shorter rotor segments 104 and 106. Each of the shorter rotor segments 104 and 106 is rotated in an opposite direction about a central axis 108 relative to the intermediate segment 102.

The intermediate rotor segment 102 has a plurality of axially extending rotor poles 110 arranged in a circular array about the central axis 108. Each of the poles 110 protrudes radially outwardly from a generally cylindrical core 112. Each of the poles 110 is circumferentially spaced apart and extends axially the entire length of the rotor segment 102. The radially outer corners of each of the poles 110 preferably are chamfered or rounded, having from about a one degree to about a three degree arc. The chamfered pole corners help to reduce flux linking between the intermediate rotor segment 102 and an energized stator pole pair. This further helps to avoid magnetic saturation that tends to occur when adjacent poles of the rotor segment 102 are out of radial alignment relative to an energized stator pole.

The second or upper rotor segment 104 also includes a plurality of axially extending rotor poles 114. The poles 114 protrude radially outwardly from an inner cylindrical core 116 and are arranged in a circular array about the central axis 108. The rotor segment 104, including the poles 114, is rotated about the central axis 108 in a counterclockwise direction relative to the corresponding poles 110 of the intermediate rotor segment 102. Preferably, the poles 114 of rotor segment 104 are angularly shifted from about six to about nine degrees counterclockwise relative to corresponding poles 110 of the first rotor segment 102, as shown in FIG. 8.

A lower end 118 of rotor segment 104 axially engages and is fixed to a first end 120 of the intermediate rotor segment 102, such as by welding corresponding rotor laminations in a known manner. Accordingly, the angular orientation of each array of rotor poles 110 and 114 are fixed relative to each other.

The third or lower rotor segment 106 also has a plurality of axially extending rotor poles 122 arranged in a circular array about the central axis 108. The rotor poles 122 are circumferentially spaced apart and are rotated in a clockwise direction about the axis 108 relative to corresponding poles 110, 114 of the other rotor segments 102, 104. For example, the third segment 116, including its poles 122, is rotated from about six to about nine degrees in a clockwise direction relative to the first rotor segment 102.

The third rotor segment 106 extends axially a predetermined length between first and second ends 124 and 126. The first end 124 of the third rotor segment 106 axially engages and is fixed to a second or lower end 128 of the elongated intermediate rotor segment 102. The angular orientation of the rotor poles 122 is fixed relative to the rotor poles 110 and 114 of the respective first and second rotor segments 102 and 104. A portion of the each corresponding rotor pole 110, 114, and 122 preferably remains axially aligned, as illustrated in FIG. 8. The relative dimensions and angular orientation of the respective rotor segments 102, 104, and 106 are substantially identical to that described with respect to the embodiment of FIGS. 1–4.

Advantageously, an electric machine having a segmented rotor stack, in accordance with the present invention, provides a more symmetric torque-angle curve. The relatively shorter segments that are shifted relative to the longer segment further result in a motor having improved torque-to-current gain.

From the above description of the invention, those skilled in the art will perceive improvements, changes and modifications. For example, when an electric machine having a different number of phases and/or rotor poles is provided, different amounts of relative rotation between rotor segments may be required to achieve a desired symmetric torque-angle curve. Such improvements, changes and modifications within the skill of the art are intended to be covered by the appended claims.

What is claimed is:

1. A variable reluctance motor comprising:

an elongated rotor shaft rotatable about a central axis;

a rotor having a first, a second and a third rotor segment, the first, second, and third rotor segments being fixedly attached to one another for joint rotation;

each of the rotor segments having a cylindrical core with an outer cylindrical surface extending about the central axis, a plurality of rotor poles extending axially along said outer cylindrical surface and circumferentially spaced apart around said outer cylindrical surface, a portion of said cylindrical surface extending between circumferentially adjacent rotor poles, and a single, centrally located aperture for receiving the shaft;

the outer cylindrical surface of the cylindrical core of each of the rotor segments having a center located on the central axis;

the plurality of rotor poles of each of the rotor segments being arranged in a circular array about the central axis and extending both radially outwardly from the outer cylindrical surface of the respective cylindrical core and axially over a length of the respective rotor segment;

a radially outer surface of each of the rotor poles forming an arc wherein each point on the arc is equidistance from the central axis;

the second rotor segment being fixed to the first rotor segment such that the rotor poles of the second rotor segment are rotated about the central axis relative to the rotor poles of the first segment;

the third segment being fixed to the first and the second segments such that the rotor poles of the third rotor segment are rotated about the central axis relative to the rotor poles of the first and the second rotor segments; and a stator encircling the rotor segments and having a plurality of stator poles arranged in a circular array, the stator poles extending both axially and parallel to the rotor poles and radially inwardly toward the central axis, the radially inner surface of the stator poles forming an arc wherein each point on the arc is equidistance from the central axis, the rotor being rotatable relative the stator;

rotation of the rotor poles of the respective rotor segments relative to one another at least partially aligning a rotor pole of at least one of the rotor segments with a stator pole of the stator such that drag associated with initial movement of the rotor relative the stator is reduced.

2. An electric machine as set forth in claim 1 wherein said poles of said second and third rotor segments are rotated in opposite directions about the central axis relative to corresponding poles of said first rotor segment.

3. An electric machine as set forth in claim 1 wherein a part of each pole of said second and third rotor segments is axially aligned with a corresponding pole of said first rotor segment.

4. An electric machine as set forth in claim 1 wherein said poles of said second and third rotor segments are rotated about the central axis a predetermined angle from about 6 degrees to about 9 degrees relative to corresponding poles of said first rotor segment.

5. An electric machine as set forth in claim 1 wherein each rotor segment is formed of a plurality of axially stacked laminations fixed to said rotor shaft.

6. An electric machine as set forth in claim 1 wherein said first rotor segment has a first axial length and said second and third rotor segments have respective axial lengths which are less than the first axial length.

7. An electric machine as set forth in claim 1 wherein said second and third rotor segments have substantially equal axial lengths.

* * * * *